UNITED STATES PATENT OFFICE.

HALL COLBY, OF NEW YORK, N. Y.

IMPROVED LUBRICATING COMPOUND FOR JOURNAL-BOXES, &c.

Specification forming part of Letters Patent No. 49,983, dated September 19, 1865.

*To all whom it may concern:*

Be it known that I, HALL COLBY, of the city of New York, in the county of New York and State of New York, have invented a new and useful Improvement in or a Composition for Journal-Boxes; and I do hereby declare that the following is a full, clear, and exact description thereof, and of its mode or manner of operation.

The nature of my invention is the production of a new composition which is capable of being used for or as a lining for journal-boxes and for like uses, which is but little exposed to wear, and therefore will have great durability, and which also is not liable to become heated by use, as are most of the compositions made use of for or in journal-boxes.

My invention consists in combining for such uses and purposes the minerals known as "asbestus" and "plumbago," not, however, confining myself to any particular proportions of said ingredients.

The indestructible character of asbestus, even when subjected to the most intense heat, is well known. It is also well known that this substance, though a mineral, can be woven into cloth and fabrics of various kinds, and that these possess the flexibility and softness and characteristics of ordinary woven goods. It is also well known that plumbago is burned with great difficulty, and is therefore particularly adapted for uses where heat and pressure exist. It is also especially adapted for counteracting friction between rubbing-surfaces, and is also very soft, producing a smooth, glossy surface.

For application to journal-boxes I use asbestus as a base, mingling with it a smaller quantity of finely-pulverized plumbago. The exact proportions of these two ingredients is not very material, but I prefer the use of from one-eighth to one-quarter of plumbago. The heavier the machinery and the greater the pressure to be borne the less should be the proportion of plumbago.

The asbestus of commerce, just as it is usually obtained, is in a condition ready for my use. When found in long fibers it should be broken up or ground before being used for the purposes now proposed.

The aforesaid ingredients may be prepared for use by mixing them with some suitable liquid in such proportions that they can be poured from a properly-shaped can in a manner similar to that in which oil is applied to the journals of machinery, except in freezing weather. Water will answer every useful purpose as the liquid to be employed for this use. In cold weather I make use of spirits. Either of these liquids soon evaporates and leaves no combustible substance behind, and are, therefore, preferable to most of the oils.

For light machinery no previous preparation is necessary. The liquid used, mingled with the asbestus and plumbago, is poured directly into the journals. It should at first be thus applied for a few times at short intervals, until the journal-boxes become completely coated, after which the machinery will run for weeks, and even for months, without friction or heat, without any further application.

For heavy machinery I prefer to interpose between the rubbing-surfaces a fabric woven from asbestus, and thus made into cloth or felt. The liquid, prepared as above described, should then be freely applied until a perfectly smooth anti-friction surface is obtained.

Instead of the cloth or felt thus contemplated, asbestus in long fibers may be used without being woven or felted, but I prefer the method above described; but in either case no combustible substance should be mingled with the asbestus.

I am aware that plumbago or other mineral substances have been mingled with vegetable and animal fiber, and also with asbestus, for the purpose of forming a steam-packing. This I do not at present claim, but limit myself now to the use of my lubricator to journal-boxes and other like uses.

I am also aware that it has been proposed to form slabs or plates by subjecting to pressure a pulp formed of asbestus and other fiber, either animal or vegetable, and plumbago, for the purpose of producing an anti-friction substance; but this also I do not claim.

What I do claim as new, and desire to secure by Letters Patent, is—

1. The use of a lubricator composed of asbestus and plumbago mingled with a liquid so as to be capable of being applied to journal-boxes and other rubbing-surfaces, in the manner substantially as hereinbefore described.

2. The use of a fabric made from asbestus and without any combustible substance being incorporated therewith, to be interposed between rubbing-surfaces and saturated with the lubricator above described, in order to produce an anti-friction surface for the journals of heavy machinery and other like purposes, substantially as described.

HALL COLBY.

Witnesses:
S. D. LAW,
W. R. RONALDS.